US009940614B2

United States Patent
Caldwell

(10) Patent No.: US 9,940,614 B2
(45) Date of Patent: Apr. 10, 2018

(54) SYNCING TWO SEPARATE AUTHENTICATION CHANNELS TO THE SAME ACCOUNT OR DATA USING A TOKEN OR THE LIKE

(71) Applicant: MX Technologies, Inc., Lehi, UT (US)

(72) Inventor: Ryan Caldwell, Provo, UT (US)

(73) Assignee: MX TECHNOLOGIES, INC., Lehi, UT (US)

(*) Notice: Subject to any disclaimer, the term of this patent is extended or adjusted under 35 U.S.C. 154(b) by 1217 days.

(21) Appl. No.: 13/986,228

(22) Filed: Apr. 11, 2013

(65) Prior Publication Data
US 2014/0310173 A1 Oct. 16, 2014

(51) Int. Cl.
G06Q 20/32 (2012.01)
G06Q 20/42 (2012.01)
H04L 9/32 (2006.01)
H04L 29/06 (2006.01)

(52) U.S. Cl.
CPC ......... *G06Q 20/322* (2013.01); *G06Q 20/425* (2013.01); *H04L 9/3215* (2013.01); *H04L 9/3226* (2013.01); *H04L 63/18* (2013.01); *G06Q 20/3221* (2013.01); *H04L 2209/56* (2013.01)

(58) Field of Classification Search
CPC .. G06Q 20/342; G06Q 50/12; G06Q 30/0635; G06Q 50/01; G06Q 10/101; G06Q 20/322; G06Q 20/3823; G06Q 20/40145; G06Q 30/0271
See application file for complete search history.

(56) References Cited

U.S. PATENT DOCUMENTS

| | | | | |
|---|---|---|---|---|
| 6,173,349 B1 * | 1/2001 | Qureshi | ................ | G06F 13/364 710/107 |
| 6,260,091 B1 * | 7/2001 | Jayakumar | .......... | G06F 13/4252 710/107 |
| 6,332,133 B1 * | 12/2001 | Takayama | .............. | G06Q 20/04 235/380 |
| 7,885,870 B2 * | 2/2011 | Nam | ...................... | G06Q 20/04 705/35 |
| 7,900,247 B2 | 3/2011 | Chong | | |
| 8,006,291 B2 | 8/2011 | Headley et al. | | |
| 8,671,444 B2 | 3/2014 | Kulkarni et al. | | |
| 8,934,865 B2 | 1/2015 | Nandagopal | | |
| 2002/0164026 A1 | 11/2002 | Huima | | |
| 2003/0101054 A1 * | 5/2003 | Davis | ..................... | G10L 15/26 704/235 |

(Continued)

OTHER PUBLICATIONS

U.S. Appl. No. 14/885,829, Office Action, dated Dec. 14, 2015.
U.S. Appl. No. 14/885,829 Notice of Allowance dated Apr. 26, 2016.

*Primary Examiner* — Steven S Kim
*Assistant Examiner* — Johann Y Choo
(74) *Attorney, Agent, or Firm* — Kunzler, PC

(57) ABSTRACT

Syncing two separate authentication channels to the same account or data using a token or the like is performed. Two authentication channels could be an online login and a mobile device login. Login for one channel creates a unique authentication code. When login from the second channel is desired, the login information is passed to the first channel device to obtain the appropriate authentication code. Then login at a service layer and data access are accomplished.

10 Claims, 1 Drawing Sheet

(56) References Cited

U.S. PATENT DOCUMENTS

| | | | |
|---|---|---|---|
| 2003/0229783 A1* | 12/2003 | Hardt | G06F 21/33 |
| | | | 713/155 |
| 2005/0150945 A1* | 7/2005 | Choi | G06Q 20/108 |
| | | | 235/379 |
| 2006/0015358 A1* | 1/2006 | Chua | G06Q 20/02 |
| | | | 705/44 |
| 2006/0053160 A1* | 3/2006 | Mattia | G06F 17/30876 |
| 2006/0261152 A1* | 11/2006 | Wong | G06Q 20/04 |
| | | | 235/379 |
| 2007/0043687 A1* | 2/2007 | Bodart | G06Q 10/107 |
| 2008/0034216 A1* | 2/2008 | Law | H04L 9/3273 |
| | | | 713/183 |
| 2008/0052192 A1* | 2/2008 | Fisher | G06Q 10/02 |
| | | | 705/5 |
| 2009/0271287 A1* | 10/2009 | Halpern | G06Q 20/10 |
| | | | 705/26.1 |
| 2010/0169223 A1* | 7/2010 | Yuan | G06Q 20/12 |
| | | | 705/67 |
| 2012/0116967 A1* | 5/2012 | Klein | G06Q 40/02 |
| | | | 705/42 |
| 2013/0054468 A1* | 2/2013 | Fuentes | G06Q 40/02 |
| | | | 705/64 |
| 2013/0297425 A1* | 11/2013 | Wallaja | G06Q 20/4014 |
| | | | 705/14.64 |
| 2014/0006297 A1* | 1/2014 | Hogg | G06Q 10/101 |
| | | | 705/319 |
| 2014/0087848 A1* | 3/2014 | Kosta | G07F 17/3218 |
| | | | 463/25 |
| 2014/0172680 A1* | 6/2014 | Prabhu | G06Q 40/025 |
| | | | 705/38 |
| 2014/0189840 A1* | 7/2014 | Metke | G06F 21/41 |
| | | | 726/9 |
| 2014/0195426 A1* | 7/2014 | Caldwell | G06Q 20/10 |
| | | | 705/42 |

* cited by examiner

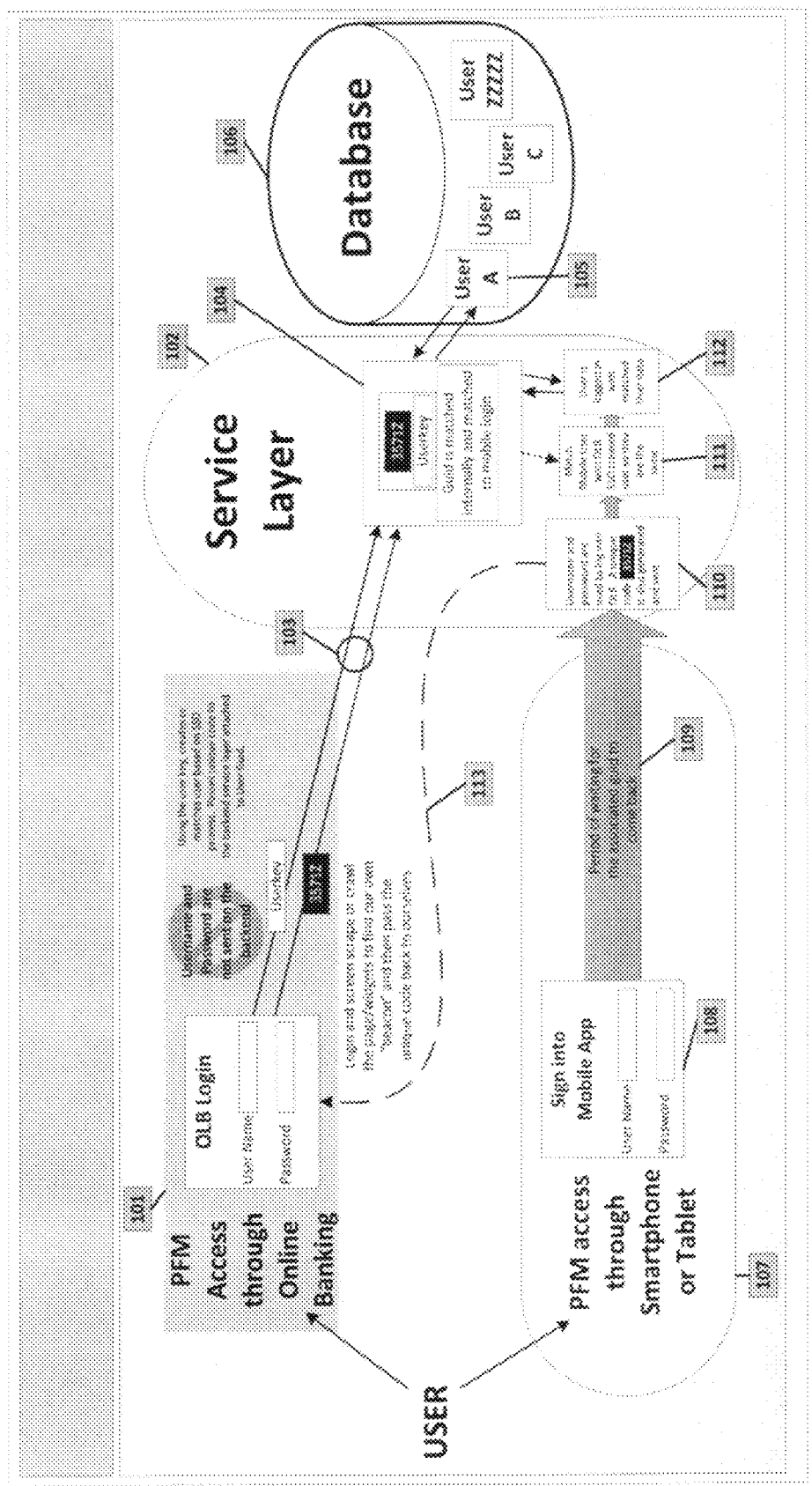

SYNCING TWO SEPARATE AUTHENTICATION CHANNELS TO THE SAME ACCOUNT OR DATA USING A TOKEN OR THE LIKE

BACKGROUND

Financial institutions (including banks, credit unions and other institutions that hold or process money for customers, clients, account holders or members, hereinafter "customers") have recognized the desire of customers to access their accounts, view financial data, and perform transactions online from a remote location such as from a home or office rather than in-person in a physical bank, or credit union, stock brokerage, etc. Customers) often find online banking more convenient and efficient than having to visit a branch in person. Further, the number of customers that find online banking more convenient is increasing, and eventually online banking will handle the vast majority of customer transactions.

To facilitate online banking, financial institutions (hereinafter "FIs") establish their own online banking system or contract with an online banking provider (OLBP) which allows the FI's customers to access their accounts and perform transactions through a remote computer system rather than in-person at the FI's physical location. That remote location may be a desktop computer, or it may be a mobile electronic devices ("MED") such as a smart phone, tablet computer, notebook computer, laptop computers, or other portable or mobile electronic device capable of accepting instructions from a customer. However due to size constraints, device limitations, the strong preference for native apps, etc., the standard OLBP experience does not normally work well on these MEDs. Consequently, each MED typically has its own application or app, potentially with a reduced set of features, different features, or otherwise differing from the OLBP experience. Consequently, the customers who use a MED may not have the same banking experience as customers who use a traditional personal computer to perform online banking functions.

The OLBP will typically require a customer to log in before functionality is provided. Behind the OLBP login, optionally personal financial management ("PFM") software provider can provide personal financial management functionality. This can include displaying account information for a user, and providing financial functionality such as, budgeting, account aggregation, reporting functions, and other money management functionality to the user. The PFM functionality may be accessed directly by the user logging in to the OLBP. Alternatively, the PFM functionality may be accessed by a user of an MED logging in to the PFM functionality via an app on the the MED. In the latter case, a problem of syncing account authentication from the OLBP log in (first channel) to the MED's app directly log in to the PFM functionality (second channel) presents a problem that must be solved. To explain it slightly differently, a customer can reach PFM functionality (the PFM service layer) through multiple paths, such as through OLBP directly or through an MED app. A technique must be used to reconcile those access paths so that a customer's identity is properly verified regardless of the access path or channel used.

SUMMARY

Therefore, because customers can reach the PFM service layer and access PFM functionality through multiple paths in an online banking environment, such as through an OLBP or through a MED app, proper customer identity verification and account access must be provided regardless of the access path. If the user accesses the PFM service layer through an OLBP the user can be prompted with a user name and password. This is a traditional access method. Alternatively if the user accesses the PFM service layer through an MED app, the user can also be prompted for username and password. More information on this access technique is provided below.

When the user logs in through the OLBP, widgets or some other software mechanism will lead the user to another window opening an application via a single sign-on from the OLBP to connect to the PFM functionality. The user uses the single sign on to sign into t PFM service layer and access PFM functionality. The OLBP announces the user's identity with a userkey, which may be a unique number or other unique key. The PFM functionality replies to the OLBP that it should populate certain data for that user. That information comes from a database accessible by the PFM functionality based on customer identity verification. The user or customer can then perform transactions supported by the PFM software utilizing that customer's account and historical data.

When a customer is using an MED, there is a somewhat different experience. As previously mentioned, the MED will typically run a software application that differs in some ways from that available on the OLBP. This can be due to memory constraints, processor speed constraints, bandwidth constraints, screen size or other constraints on the MED. In time such constraints may be lessened, but are likely to exist for the foreseeable future.

Through an MED login experience, the user will enter a username and password. But once the user has logged in in this fashion, there is a question as to how to determine that the mobile user is the same user who previously logged in through the OLBP. This is a problem because for the MED sign-in, the MED app does not pass the PFM service layer, as the app is already installed on the MED. Instead, the MED app just passes a userkey or other unique identifier to the PFM service layer. So when the user enters a user name and password into the mobile login, there is a problem determining which userkey or unique identifier to link it to. One possibility Is to create a whole new user account at the PFM service layer for the mobile user, but it is not desirable for a single customer to have two or more sets of data which must be reconciled at a sinfle FI. instead, it is preferable to simply point the mobile user to the same account and data accessible by the user from the OLBP so that the MED app can efficiently provide mobile customers with desired PFM functionality using their personal account and historical data stored on the FI's database.

BRIEF DESCRIPTION OF THE DRAWINGS

FIG. 1 depicts an example architecture implementing the invention.

DETAILED DESCRIPTION

The solution to the problem noted above is to create software functionality such that when a user enters his or her username and password into the MED, prior to accessing the PFM service layer, and attempts to access data, the software first will take the separate step of accessing the PFM service layer to login to that layer using the same username and password. The username and password have already been authenticated at the OLBP and a userkey or other unique identifier has already been created for it. Therefore when the MED passes a username and password to the PFM service layer, the service layer logs into the OLBP and enters the username and password.

Using that mobile user name and password, the service layer logs into online banking and enters the username and password, and then looks for the userkey or other unique identifier that corresponds to that username and password. The OLBP provides that userkey to the PFM service layer, successfully identifying the user's account and permitting the PFM service layer to access its database and provide appropriate data and functionality to the MED user.

What the system has done is take the userkey, which is known via the OLBP login, and paired it with the username & password which is known from the mobile login. Because PFM service layer userkey is unique, that unique user's data may be accessed in the database connected to the PFM service layer, and the correct user's data is retrieved, including when login occurs through a MED. Therefore the user logging in through a MED will be paired correctly with that user's data, through username and password, and through the userkey or unique identifier verified through OLBP by the PFM service layer. This technique syncs the user's online banking experience with his/her mobile banking experience. These processes are transparent to the user and occur in milliseconds.

Referring to FIG. 1, one implementation of the invented system, software and method is depicted. An OLBP 101 permits access or login via use of a username and password in order to provide online banking services. This is a single sign-on process (SSO) that is not repeated by the user or by software at the PFM service layer 102. The login system creates a unique identifier such as a userkey which may be sent 103 to the service layer 102 for login. The unique userkey is used to create an account or match a user to an existing account. Only the unique userkey is sent to the back end. The userid and password are not sent to the back end.

When the userkey is passed 103 to the service layer 102 a globally unique identifier (hereinafter "GUID") 104 matches it to a user, such as "User A" 105 in the database 106 of user data (banking data, transactional data, etc.). This permits the user logging in through the OLBP to access his or her data and conduct online banking transactions. This allows the system to find the correct account and history data for a particular user, based on the GUID, which was based on a unique userkey, which was based on a username and password from the OLB login.

Also referring to FIG. 1, when a customer uses an MED to employ PFM functionality, a different login procedure takes place. In this case, the user logs s in to a PFM app on his or her MED 107, and there is standard a sign-in process 108 which uses username an password to let the user sign in to the app. But that alone does not establish login to the PFM service layer or access account data in the database 106. The username and password that were used to log in to the MED cannot achieve login to the PFM service layer because from the OLB login, user name and password were not passed to the PFM. So after the user logs in to the MED app 108, the MED app passes the username and password to the PFM service layer 102, but not for direct login purposes. At the PFM service layer 102, the username and password are then passed 113 back to the OLB in step 110 where login is performed to generate or obtain a unique userkey. That unique userkey from step 110 is then passed to the PFM layer 102 where it is matched 104 to the corresponding GUID. The GUID is matched via software process 111 to the user information 112. Thus, the user is logged in at the PFM service layer and matched with that user's account data and history from the database 106.

It may be important to note that when a user logs in to the PFM layer from an MED, the MED does not simply log in through the OLB server. There is actually a separate software process in the PFM layer which sends the username and password from the MED login to the OLB in order to obtain the unique userkey associated with the user in question. That userkey is then sent to the PFM where it is matched with its corresponding GUID, allowing the userkey to be effectively matched to a user and his/her unique account and history information from the database. This allows the user to have the same account, data, transaction history, etc. regardless of when the user may switch from OLBP to MED and back again. At that point, the user should have essentially the same experience regardless of whether using OLBP or the PFM app on an MED.

The invention has many uses across many industries, but is discussed herein with regard to a specific example of personal financial management software for the banking industry. Such specific discussion should not be considered to be limiting of the interpretation of the scope of the claims. Those skilled in the art will appreciate that variations and modifications may be made without departing from the principles of the invention as herein illustrated, described, and claimed. The present invention may be embodied in other specific forms without departing from its spirit or essential characteristics. All described embodiments are to be considered in all respects as only illustrative, and not restrictive. The scope of the invention is, therefore, indicated by the appended claims, rather than by the foregoing description. All changes which come within the meaning and range of equivalency of the claims are to be embraced within their scope.

The invention claimed is:

1. A method for syncing account authentication from an online banking provider ("OLBP") with a mobile electronics device ("MED") comprising:
   accessing a device communicatively coupled to an OLBP;
   receiving login credentials for the OLBP, the login credentials comprising a username and a password;
   logging into the OLBP at the device using the username and password;
   generating, at the OLBP, a unique user key for the user based on the username and password;
   providing, from the OLBP, the unique user key to a personal financial management ("PFM") software service layer;
   creating, at the PFM software service layer, an account for the user based on the unique user key;
   generating, at the PFM software service layer, a globally unique identifier ("GUID");
   associating, at the PFM software service layer, the GUID with the user;
   accessing a MED comprising a PFM application;
   receiving the login credentials for the OLBP at the MED, the login credentials comprising the username and the password;
   logging into the MED PFM application using the username and the password;
   providing the username and the password to the PFM software service layer from the MED PFM application via a first authentication channel, the PFM software service layer executing on a device remote from the MED and the OLBP, the first authentication channel comprising a communication channel between the MED PFM application and the PFM software service layer;

logging into the OLBP via the PFM software service layer using the username and the password;

determining the unique user key associated with the username and password at the OLBP in response to successfully logging into the OLBP;

providing the unique user key from the OLBP to the PFM software service layer via a second authentication channel, the second authentication channel comprising a communication channel between the PFM software service layer and the OLBP;

determining, at the PFM software service layer, the globally unique identifier ("GUID") associated with the user based on the unique user key;

accessing, at the PFM service layer, account data for the user, the account data being accessible using the GUID associated with the user;

associating, by the remote device executing the PFM software service layer, the account data uniquely identified by the user key with the username and password based on the GUID; and providing the account data to the MED PFM application for display on the MED within the MED PFM application.

2. A method as recited in claim 1, further comprising permitting the user to conduct banking transactions using the account data through the MED PFM application.

3. A method as recited in claim 1, further comprising permitting the user to manipulate and change the account data through the MED PFM application.

4. A method as recited in claim 1, further comprising accessing a database where the account data is stored.

5. A method as recited in claim 4, wherein accessing a database is performed by the PFM service layer.

6. A computer program product comprising a non-transitory computer readable storage medium storing code executable by a processor to perform operations, the operations comprising:

receiving login credentials at a first device for a banking platform, the login credentials comprising a username and a password, the banking platform in communication with a software service layer via a first authentication channel between the banking platform and the software service layer, the software service layer executing on a device remote from the first device;

logging into the banking platform via the first device using the username and the password;

generating a user key, via the banking platform, based on the username and the password in response to logging into the banking platform;

providing the user key to the software service layer from the banking platform via the first authentication channel;

creating, at the software service layer, an account for the user based on the unique user key;

generating, at the software service layer, a globally unique identifier ("GUID");

associating, at the software service layer, the GUID with the user;

receiving the username and the password at a second device for a banking application executing on the second device, the second device different than the first device, the banking application in communication with the software service layer via a second authentication channel;

logging into the banking application on the second device using the username and the password;

providing the username and the password to the software service layer via the second authentication channel;

logging into the banking platform via the software service layer using the username and the password;

determining the user key associated with the username and password at the banking platform in response to successfully logging into the banking platform;

providing the user key from the banking platform to the software service layer via the first authentication channel;

determining, at the software service layer, the globally unique identifier ("GUID") associated with the user based on the user key;

accessing, at the software service layer, account data for the user, the account data being accessible using the GUID associated with the user;

associating, by the remote device executing the software service layer, the account data uniquely identified by the user key with the username and password based on the GUID; and providing the account data to the banking application for display on the second device within the banking application.

7. A computer program product as recited in claim 6, the operations further comprising permitting the user to conduct transactions on the account data.

8. A computer program product as recited in claim 6, the operations further comprising permitting the user to manipulate and change the account data.

9. A computer program product as recited in claim 6, the operations further comprising accessing a database where the account data is stored.

10. A computer program product as recited in claim 6, further the operations further comprising running a software application on the second device to manipulate the account data.

* * * * *